June 18, 1940.   J. E. DEVLIN   2,204,886
CROSS CHAIN FOR AUTOMOBILE TIRES
Filed Nov. 3, 1938
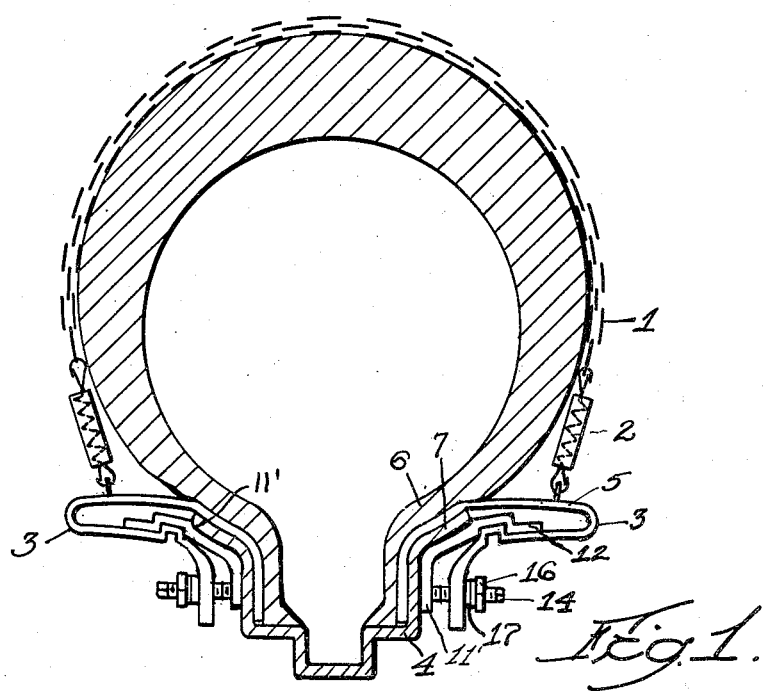
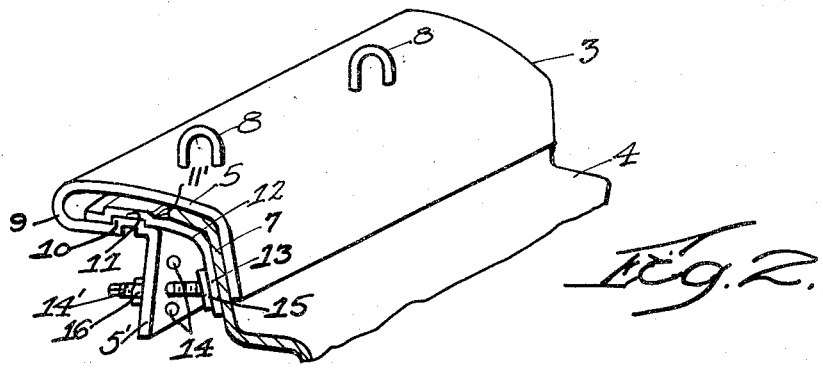
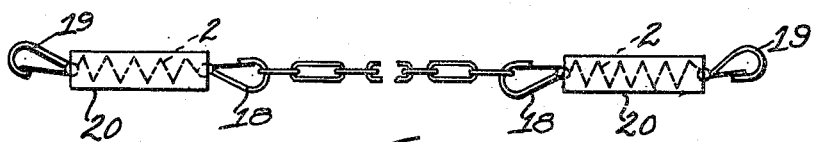
Inventor:
James E. Devlin
By Charles A. Warren
Attorney Patented June 18, 1940

2,204,886

UNITED STATES PATENT OFFICE 2,204,886

CROSS CHAIN FOR AUTOMOBILE TIRES

James E. Devlin, Worcester, Mass.

Application November 3, 1938, Serial No. 238,628

1 Claim. (Cl. 152—233)

The present invention relates to a cross chain for automobile tires, and particularly to a means for attaching a chain at opposite ends to the rim of the wheel on which the tire is mounted.

In prior devices of this character the so-called "mud-hooks" have been attached by inserting the strap by which the opposite ends of the chain are connected together between adjacent spokes of the automobile wheel. The recent development and almost universal use of pressed steel wheels leaving practically no opening between the hub and rim so that the strap on "mud-hooks" cannot be inserted, has made it necessary to return to the use of complete sets of chains entirely encircling the tire. These complete sets of chains are unsatisfactory, especially in emergency use, since they cannot be applied without either jacking up the automobile wheel from the ground, or by driving the automobile onto the chain after it has been laid either in front or in back of the tire. Neither of these two modes of application is generally possible when an automobile is mired in either deep snow or mud.

Moreover, the application of either complete sets of chains or "mud-hooks" involves difficulty when an automobile is mired, especially where the person applying the chain is not so attired that he can crawl practically underneath the vehicle. One of the principal features of the present invention is a provision of means for quickly and easily applying cross chains which are so arranged that they can be just as readily removed when the necessity for chains no longer exists. In accordance with the present invention the wheel rim has applied thereto suitable clips, which, although removable, are securely fastened to the rim so that they will remain on the rim whether or not cross chains are applied thereto. The ends of the cross chains are engaged with these clips by releasable hooks.

Cross chains which have become somewhat worn are frequently broken before they are entirely worn out by the strain on the individual links as the chain engages the load. A further feature of the present invention resides in the provision of a spring mounting for the cross chains, so that they are held resiliently instead of rigidly and the sudden shocks which would break the chain links are cushioned to some extent by the springs. By this arrangement not only is breakage of the cross chains materially reduced, but the looseness of the chains, so often objectionable by reason of the noise, is eliminated, since the spring connection will hold the cross chain tightly against the tire tread.

When chains are tight on a wire and a skid occurs, the chain being tight, does not flex enough to clean the individual links of ice or snow and each cross chain acts as a runner. By the resilient mounting of each cross chain the links of the chain are more free and will flex during skidding so that the links are cleaned of snow or ice and can hold better. Moreover, when the chain is held by springs, the several links can crowd together during a skid, for more effective holding action. Thus the advantages of loose cross chains are obtained without their disadvantages, since the springs normally hold the chains tightly against the tire.

Other and further objects and advantages of the invention will hereinafter more fully appear from the following detailed description taken in connection with the accompanying drawing, in which—

Fig. 1 is a sectional view through a tire and rim, showing a cross chain embodying the invention, applied thereto.

Fig. 2 is a perspective view of the clamp on a somewhat larger scale, showing its application to the rim of the wheel.

Fig. 3 is a plan view of the cross chain removed from the tire.

With reference first to Fig. 1, the cross chain 1, which is of any suitable chain structure of the type useful for automobile wheels, has a coil spring 2 at each end thereof. The ends of the coil spring are releasably secured to clips or clamps 3 which are positively mounted on the wheel rim 4. These clamps are intended to be removable from the rim during the portions of the year when cross chains are unnecessary, but are mounted on the rim to remain thereon during the portions of the year when mud and snow conditions prevail. The releasable connection between the cross chain 1 and the clamps 3 makes it possible to remove the cross chain without the removal of the clamps.

As best shown in Fig. 2, the clamps 3 may comprise an arcuate plate 5, the inner edge of which is positioned between the tire 6, Fig. 1, and the side wall 7 of the wheel rim, so that as the tire is inflated, the plate 5 is clamped securely between the tire and rim. The plate 5 has one or more open loops 8 secured thereto and extending upwardly therefrom, preferably in a plane parallel to the side wall of the tire casing, provide a connection for the ends of the cross chain.

The outer edge of the arcuate plate 5 is turned under, as indicated at 9, and has a longitudinally extending integral bar 10 thereon engageable by a groove 11 in a plate 12, which, as shown in Fig. 2, is curved to correspond approximately to the curvature of the plate 5 with the lower edge 13 of the plate positioned on the outside of the flange 7 of the rim. The plate 5 has a depending flange 5' having a plurality of alined threaded openings 14 to receive an adjustable screw 14' which extends approximately horizontally through the flange 5'. The inner end of the screw 14' has a rockable shoe 15 engageable with the plate 12 for clamping said plate against the rim. A locking nut 16 and a lock washer 17 may hold the screw 14' in adjusted position. By this arrangement the clamp 3 is positively held on the wheel rim, whether or not the cross chains are connected thereto.

The bar 10 and groove 11 extend the entire length of the corresponding plates 5 and 12 so that the plate 5 may be first positioned on the wheel rim and the plate 12 may then be slid endwise within the plate 5 into the position shown. A shoulder 11' is formed on the plate 12 opposite to the groove 11 to engage with the outer edge of the wheel rim, as shown.

With reference now to Fig. 3, the cross chain 1 is connected to each of the springs 2 by a releasable snap hook 18 secured to the end of the coil spring and releasably engaging the end link of the cross chain. On the opposite end of each coil spring is a second snap hook 19 by which the cross chain may be releasably attached to the opposed clamps 3. By this arrangement the cross chain may be applied to or removed from the tire at any time without difficulty. Each coil spring may have a rubber cover 20, as shown, to prevent wear on the tire casing.

Since the cross chains are held onto the clamps through the medium of the coil springs it is apparent that the cross chain can be tight enough to prevent any noise from the chain as the wheel turns. At the same time the resilient connection is such that excessive shock on the chain as the latter engages with the road surface is prevented and the strain on the clamps is minimized. Thus, the cross chains will have an appreciably longer period of usefulness before they break and must be discarded. When the chain must be discarded, the coil springs are unsnapped therefrom and it is necessary only to replace the chain element itself rather than the entire cross chain, including the coil springs. Thus the replacement cost of cross chains is materially reduced without in any way affecting the efficient functioning of the chains.

Where the equivalent of a full set of tire chains is desirable it will be apparent that a plurality of pairs of opposed clamps may be uniformly spaced about the periphery of the wheel rim with each clamp arranged to support a pair of cross chains, as shown in Fig. 2. It is thus possible to have either one or more cross chains to function in the same manner as "mud-hooks," or in more difficult travelling, to have the equivalent of a full set of chains. Obviously, in putting on the clamps, it might be desirable to mount a sufficient number of pairs of clamps so that the full set of chains could be placed thereon when desired. It is obvious that only one of the pairs of clamps would need to be utilized if the circumstances were such that a single "mud-hook" would be satisfactory.

I claim:

A clip for attachment to a wheel rim, comprising a plate having its inner edge positioned between the tire and the side wall of the rim, a second plate engageable with the outside of the side wall of the rim, a clamping screw for holding said plates together and in positive engagement with the wheel rim, said plates having cooperating interengaging elements for holding said plates in predetermined relation to each other, and one of said plates having attaching means thereon by which a cross chain may be attached thereto.

JAMES E. DEVLIN.